March 22, 1966   F. A. DE PUYDT ETAL   3,241,639
TRAILER HITCH AND BRAKE ACTUATING ASSEMBLY
Filed May 14, 1964   4 Sheets-Sheet 1
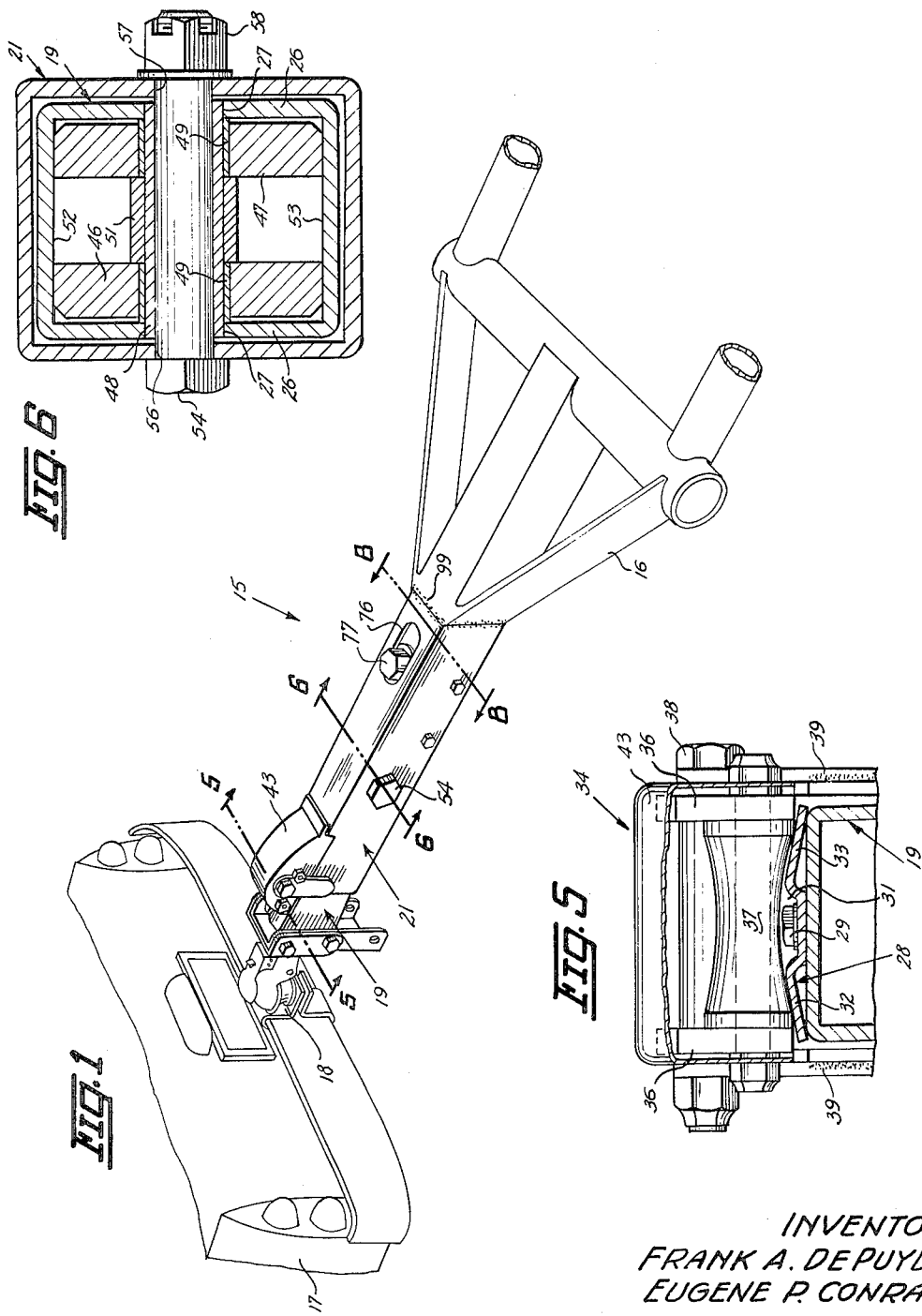
INVENTORS.
FRANK A. DE PUYDT
EUGENE P. CONRADI
BY Rudolph L. Lowell
ATTORNEY.

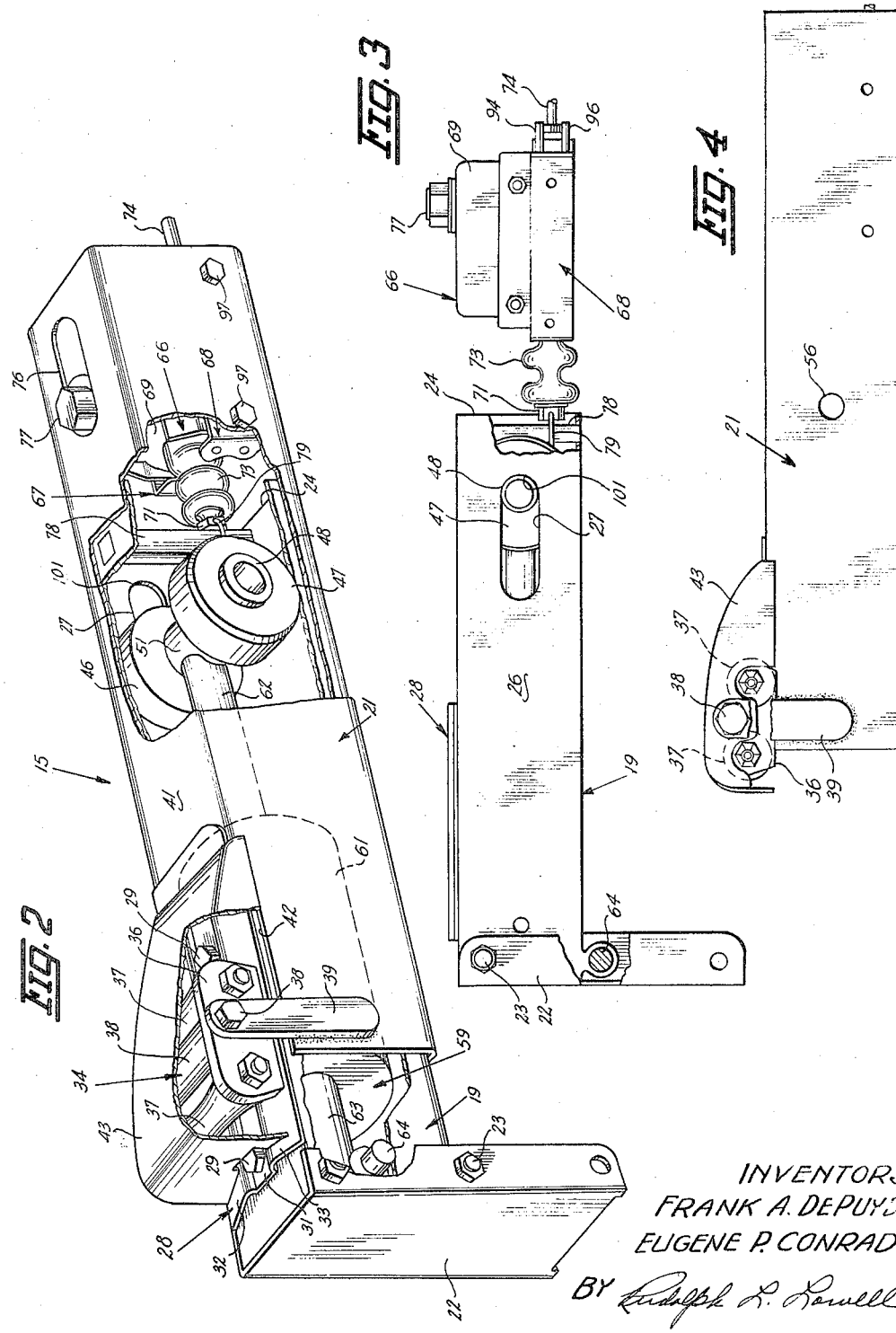

INVENTORS.
FRANK A. DEPUYDT
EUGENE P. CONRADI
BY Rudolph L. Lowell
ATTORNEY.

March 22, 1966 F. A. DE PUYDT ETAL 3,241,639
TRAILER HITCH AND BRAKE ACTUATING ASSEMBLY
Filed May 14, 1964 4 Sheets-Sheet 4
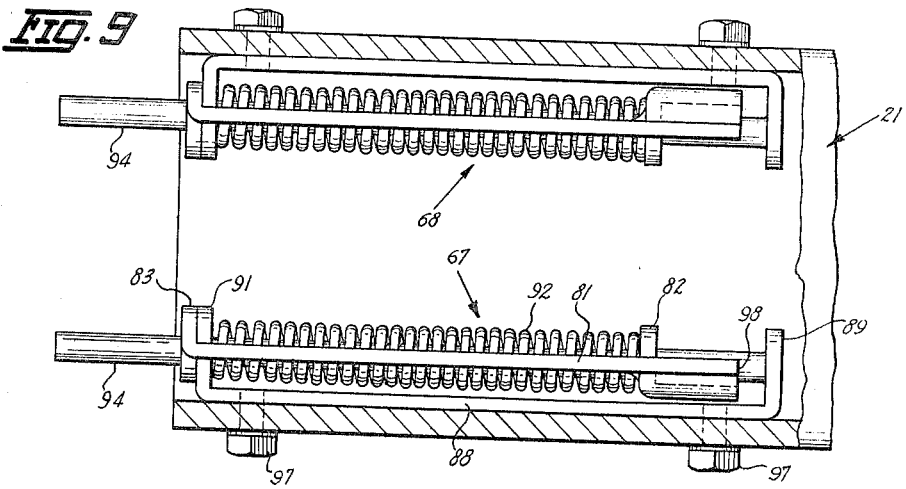
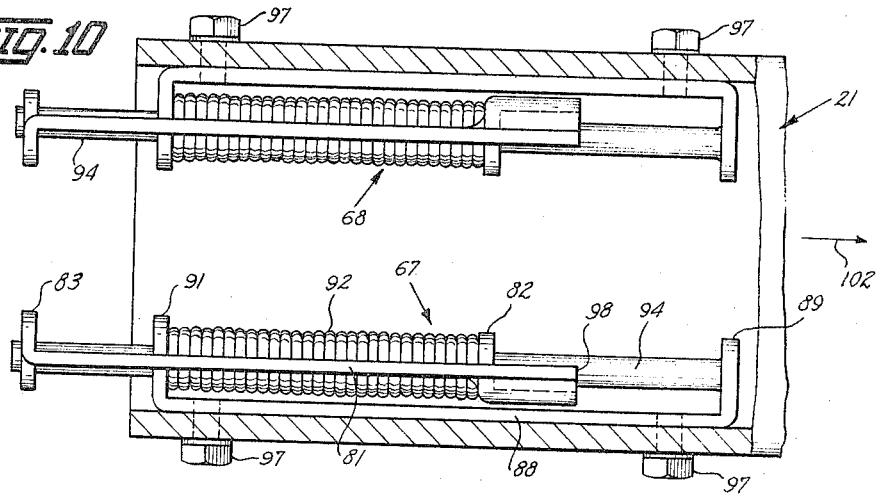
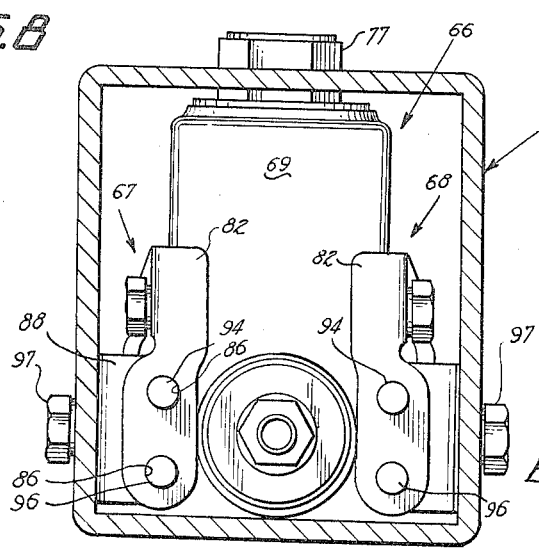
INVENTORS.
FRANK A. DE PUYDT
EUGENE P. CONRADI
BY
ATTORNEY.

United States Patent Office 3,241,639
Patented Mar. 22, 1966

3,241,639
TRAILER HITCH AND BRAKE ACTUATING
ASSEMBLY
Frank A. De Puydt and Eugene P. Conradi, Des Moines,
Iowa, assignors to Dico Corporation, Des Moines, Iowa,
a corporation of Iowa
Filed May 14, 1964, Ser. No. 367,338
7 Claims. (Cl. 188—112)

This invention relates to a brake actuating mechanism for a trailer and more particularly to a trailer tongue and an associated mechanism for actuating the brakes of the trailer.

The object of this invention is to provide an improved hitch and brake actuating assembly for a towed vehicle.

Another object of the invention is to provide a hitch and brake actuating assembly for establishing a draft connection between a trailer and a power towing vehicle which is automatically responsive to a forward movement of the trailer relative to the towing vehicle to actuate the trailer brakes.

A further object of the invention is to provide a trailer hitch and brake actuating assembly capable of absorbing abrupt impact loads without damaging the brake mechanism of the trailer.

Still another object of the invention is to provide a hitch and brake actuator assembly for a trailer in which all movable parts are confined within housing means to protect them against road and other hazards.

Yet another object of the invention is to provide a trailer hitch assembly having relatively movable telescoping hitch members continuously maintained in a guided clearance relation for relative longitudinal movement regardless of the towed position of the trailer relative to the tractor.

An additional object of this invention is to provide a trailer hitch and brake actuating assembly which is compact and rugged in construction and efficient and reliable in operation.

Further objects, features and advantages of this invention will become apparent in connection with the accompanying drawing in which:

FIG. 1 is a perspective view of the trailer hitch and associated brake actuating mechanism of this invention shown in assembly relation with a towing vehicle;

FIG. 2 is an enlarged perspective view of the trailer hitch and brake actuating mechanism with some parts broken away for the purpose of clarity;

FIG. 3 is a side elevational view of the first hitch member and associated brake actuating mechanism;

FIG. 4 is a side elevational view of the second hitch member;

FIG. 5 is an enlarged sectional view taken along the line 5—5 of FIG. 1;

FIG. 6 is an enlarged sectional view taken along the line 6—6 of FIG. 1;

FIG. 8 is an enlarged sectional view taken along the line 8—8 of FIG. 1;

FIG. 9 is a fragmentary plan view of the resilient support structure for the master cylinder under normal load conditions; and FIG. 10 is a view similar to FIG. 9 showing the resilient support structure under impact load conditions.

Figure 7:
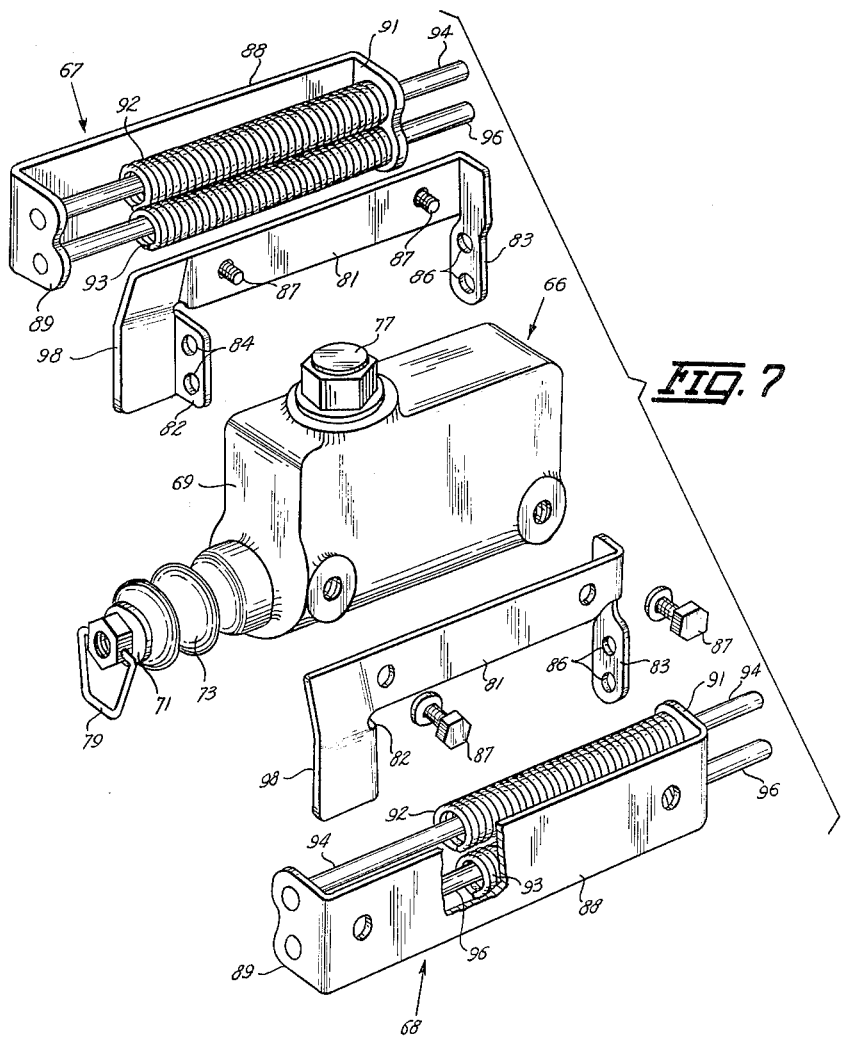
FIG. 7 is an exploded perspective view of the master cylinder assembly and resilient support structure therefor of the brake actuating mechanism of this invention.

Referring to the drawing, there is shown in FIG. 1 the hitch and brake actuating assembly of this invention, indicated generally at 15, in assembled relation with the tongue 16 of a trailer vehicle. The hitch and brake actuating assembly 15 is attached to a towing vehicle 17, such as an automobile, by a conventional ball and socket connection 18.

As shown in FIG. 2, the hitch and brake actuating assembly 15 comprises a pair of inner and outer tubular members 19 and 21, respectively. The tubular members 19 and 21 are rectangular in transverse cross section with the member 19 telescoped into the member 21. A channel-shaped mounting plate 22 for carrying the socket portion of the ball and socket connection 18, is secured to the front end of the inner tubular member 19 by nut and bolt assemblies 23. The rear end 24 of the member 19 is open. Positioned forwardly of the rear end 24 and formed in the side walls 26 of the member 19 are a pair of oppositely arranged longitudinally extended slots 27.

A track member 28 (FIGS. 2, 3 and 5) extended longitudinally of the member 19 and of a width substantially equal to the transverse dimension of the top side of the member 19 is positioned on such top side adjacent the mounting plate 22. Bolts 29 secure the track member 28 to the top of the tubular member 19. The track member 28 is formed from a flat plate and has a longitudinally extended groove 31 and a pair of curved rails 32 and 33 inclined downwardly in opposite directions from the groove 31. The bolts 29 are inserted through openings (not shown) in the base of the groove 31.

As shown in FIG. 2, a roller unit indicated at 34 rides on the rails 32 and 33 and maintains the tubular members 19 and 21 in longitudinal alignment. This roller unit 34 includes a pair of side frame members 36 and a pair of guide rollers 37 positioned between and rotatably supported at opposite ends on the frame members 36. Intermediate the guide rollers 37, the frame members 36 are rockably supported on a shaft 38 the opposite ends of which are carried in a pair of oppositely arranged and upright arms 39 which are secured by a weld or the like to a corresponding side wall of the outer tubular member 21. As appears in FIG. 2, the top wall of the tubular member 21 has a portion removed or cut away from the front end thereof to a position spaced rearwardly of the roller unit 34 to provide a roller working space 42.

The rollers 37 of the roller unit 34 are substantially identical in size and shape. As shown in FIG. 5, each roller 37 is of a generally spool shape having a peripheral surface of a concave contour in a direction axially of the roller. The transverse curvature of the rails 32 and 33 corresponds substantially to the reverse axial inclination of the peripheral portions of the rollers 37 so as to provide a complemental bearing surface for the rollers 37. A housing 43, for enclosing the roller unit 34, is carried on the opposite ends of the shaft 38 adjacent the upright arms 39.

Mounted within the rear end section of the inner tubular member 19 is a roller assembly which includes a pair of roller members 46 and 47 journaled on the opposite ends of a tubular sleeve 48. As best shown in FIG. 6, the sleeve 48 is of a length equal to the transverse dimension of the tubular member 19. The ends of the sleeve 48 are positioned within the longitudinal slots 27 formed in the side walls 26 of the member 19. The roller members 46 and 47 have sleeve bearings 49 mounting the roller members adjacent the side walls 26. The longitudinally spaced relation between the rollers 46 and 47 is maintained by a central spacing collar 51 positioned about the sleeve 48.

As shown in FIG. 6, the roller members 46 and 47 are of a diameter corresponding substantially to the inner vertical dimensions of the tubular member 19 so as to be in rolling engagement with the inner surfaces 52 and 53 of the member 19.

The sleeve 48 is mounted on a transverse bolt 54 projected through openings 56 and 57 in the side walls of the outer tubular member 21. A nut 58 holds the bolt 54 in assembled relation with the tubular member 21.

As shown in FIG. 2, the collar 51 is connected to the forward section of the inner tubular member 19 by a dashpot device 59. Included in the dashpot device is a cylinder 61 having opposite axially extended plungers 62 and 63. The plunger 62 is attached to the collar 51 and the plunger 63 is attached to a transverse pin 64 carried on the forward end section of the tubular member 19.

A master cylinder assembly 66 is positioned in the rear end section of the outer tubular member 21 and is attached to the side walls thereof by a pair of resilient mounting members 67 and 68. The master cylinder assembly 66 is a commercial unit manufactured by the Wagner Lockheed Corporation as Model No. FE2765 and comprises a cylinder and reservoir unit 69 and a piston 71 extended longitudinally of the tubular member 19. The forward section of the piston 71 projects from the cylinder and reservoir unit 69 and is enclosed by a foldable rubber bellows 73. On movement of the piston 71 into the cylinder and reservoir unit 69 hydraulic fluid under pressure is delivered to the braking system of the trailer through conduit 74. The trailer braking system is disclosed in U.S. Patent No. 2,973,839.

The top wall of the outer tubular member 21 has a longitudinal slit 76 to provide an access opening for the fill cap 77 of the cylinder and reservoir unit 69. The forward end of the piston 71 is adjacent a square upright pin 78 secured at its oppoiste ends to the top and bottom walls of the inner tubular member 19. A wire clip 79 extended about the pin 78 is attached to the forward end of the piston 71 thereby coupling the piston 71 with the tubular member 19.

As shown in FIG. 7, the resilient mounting members 67 and 68 are disposed on opposite sides of the master cylinder assembly 66. Since the mounting members 67 and 68 are substantially identical in construction the following description is limited to the mounting member 67, with corresponding numerals being applied to like parts. The mounting member 67 comprises a bracket 81 having downwardly and transversely extended arms 82 and 83 at its opposite ends having pairs of vertically aligned holes 84 and 86, respectively. Bolts 87 secure the bracket 81 to the side of the cylinder and reservoir unit 69. A supporting plate 88 having inwardly directed legs 89 and 91 at its opposite ends is positioned adjacent the arms 82 and 83 of the bracket 81. A pair of compression springs 92 and 93 are interposed between the legs 89 and 91 and are carried on a pair of rods 94 and 96. The forward ends of the rods 94 and 96 are secured to the leg 89 and their rear ends project through the leg 91.

As shown in FIGS. 8 and 9, the rods 94 and 96 project through the holes 84 and 86 in the legs 82 and 83 of the bracket 81 so that the opposite ends of the springs 92 and 93 are in engagement with the arm 83 and the leg 91, respectively. The arm 82 is positioned rearwardly of the leg 91 so as to permit the bracket 81 to move in a rearward direction against the biasing force of the springs 92 and 93. The plate 88 is secured to the side wall of the outer tubular member 21 by bolts 97 which project through the side wall for threaded engagement with the plate 88.

The springs 92 and 93 of the resilient mounting members 67 and 68 bias the master cylinder assembly 66 to a forward position. In this position the leg 82 of the bracket 81 is in bearing engagement with the transverse leg 91 of the plate 88.

In use, the hitch and brake actuating assembly 15 is secured, as by welding indicated at 99 in FIG. 1, to the tongue 16. This welding is done prior to the insertion of the inner tubular member 19 and the master cylinder assembly 66 within the outer tubular member 21 to eliminate any possible heat damage to the mechanism associated with the master cylinder assembly and its mounting members 67 and 68.

The efficient and safe operation of the trailer brakes depends upon a free relative longitudinal movement between the tubular members 19 and 21 either during a straight pull or during any turning movement of the towing vehicle and the trailer. In other words, any rubbing action between corresponding side walls of the tubular members 19 and 21 must be minimized to prevent any binding action therebetween which would impede or retard a free moving action between the tubular members 19 and 21. This binding action is most likely to occur during a turning movement of the vehicle. A side torque or a thrust applied to the forward end of the hitch produces a cantilever action thereon tending to move the tubular members 19 and 21 in relative transverse directions.

With the tubular members 19 and 21 positioned in a telescoped relation, the track member 28 is located within the working space 42 in coacting bearing engagement with the corresponding peripheral portions of the rollers 37. By virtue of this coacting engagement, the rollers 37 ride longitudinally of the rails 32 and 33 during any relative longitudinal movement between the tubular members 19 and 21. Any tendency for relative transverse movement between the members 19 and 21 is prevented by the coaction of the reversely inclined rails 32 and 33 with the concave peripheral surfaces of the rollers 37. By virtue of their rockable support on the shaft 38, the rollers 37 assist each other in maintaining continuous engagement with the rails 32 and 33.

The corresponding top and bottom walls of the tubular members 19 and 21 are maintained in a clearance relation by the riding action of the roller members 46 and 47 on the inner surfaces of the top and bottom walls of the tubular member 19, and the support of the tubular sleeve 48 on the bolt 54 which is carried in the side walls of the outer tubular member 21.

In use, during the towing of a trailer the outer ends of the tubular sleeve 48 are against the rear ends 101 of the slots 27 so as to provide a direct coupling between the tubular members 19 and 21. In this position, the piston 71 is in an extended position as shown in FIG. 3. As a result the fluid pressure in the braking system is nominal.

On the application of the towing vehicle's brakes, the outer tubular member 21, the rollers 37 and the cylinder and reservoir unit 69 of the master cylinder assembly 66, move as a unit in a forward direction relative to the inner tubular member 19 against a retarding effect of the dashpot device 59. As the cylinder and reservoir unit 69 moves in a forward direction, the piston 71 engages the upright pin 78 so that the cylinder and reservoir unit 69 moves longitudinally relative to the piston 71. This relative movement actuates the master cylinder assembly 66 to increase the hydraulic pressure in the brake system whereby to effect the actuation of the trailer brakes. This actuation of the trailer brakes thus takes place in response to the difference in the de-acceleration between the towing vehicle and the trailer. When the towing vehicle is moving at substantially the same rate of speed as the trailer, the trailer brakes will be released since the telescoped tubular members 19 and 20 move to an expanded position to retract the piston 71 from the cylinder and reservoir unit 69.

In heavy duty work and in downhill operation, when the brakes of the towing vehicle are applied, the inertia effect of the trailer produces an impact load on the outer tubular casing 21. This load is transmited to the inner tubular member 19 through the master cylinder assembly 66 and the lost motion slots 27 and coupling bolt 54 so as to produce in the master cylinder 66 an abnormal pressure which is greater than the normal braking pressures of the trailer braking system.

Unless this abnormal pressure is controlled, resultant damage often occurs to the hose connections and parts of the trailer brake system. In the present invention this excessive hydraulic pressure is limited by the resilient action of the master cylinder mounting members 67 and 68.

As shown in FIG. 9, the springs 92 are illustrated in their extended positions between the flanges or abutments 91 and 82 of the supporting plates 88 and brackets 81, respectively. In such extended positions, the pressure of the springs acting to maintain the brackets 81 against movement relative to the plates 88 axially of the rods 94 is substantially equal to the predetermined hydraulic pressure required to brake the trailer vehicle. As long as this pressure is not exceeded, the cylinder and reservoir unit 69 will remain substantially stationary relative to the tubular member 21 during the braking of the trailer, so that retraction and extension of the piston 71 will take place as above described.

However, and as shown in FIG. 10, when an impact load is applied to the outer tubular member 21 in a forward direction shown by the arrow 102, the springs 92 and 93 of the mounting members 67 and 68 are compressed. With the compression of the springs 92 and 93, the cylinder and reservoir unit 69 is biased in a forward direction with a force which is below the impact force applied to tubular member 21. As a result, movement of the cylinder and reservoir unit 69 relative to the piston 71 is retarded or eliminated whereby to substantially maintain the predetermined hydraulic pressure in the trailer brake system. In other words, the resilient action of the springs 92 and 93 controls the hydraulic pressure developed in the master cylinder 66, under an impact load, by retarding the forward movement of the cylinder and reservoir unit 69 relative to the piston 71.

In summary this invention provides a hitch and trailer brake actuator assembly 15 wherein a pair of telescoping hitch members are held in a clearance relation at all times by the coaction of a guide roller unit 34 and a track member 28. A pair of roller members 46 and 47 engageable with the top and bottom side portions of the inner telescoping tubular member 19 supports the outer tubular telsecoping member 21 for free longitudinal movement.

A master cylinder assembly 66 is resiliently mounted by mounting members 67 and 68 on the rear end section of the outer tubular member 21. The master cylinder assembly 66 is responsive to relative contractive movement between the telescoping members 19 and 21 to establish hydraulic pressure for the braking system of the trailer. The resilient mounting members 67 and 68 provide a resilient lost motion connection, between the member 21 and the cylinder and reservoir unit 69, which provides for an operative movement of the unit 69 relative to the piston 71 for braking operations of the trailer below a predetermined hydraulic braking pressure, and acts to maintain such predetermined pressure under an impact load by minimizing the inertia effect of such load on the cylinder and reservoir unit 69 of the master cylinder assembly 66. As a result, the yieldable mounting for the master cylinder assembly provides for the maintenance of a predetermined maximum hydraulic pressure by controlling the movement of the cylinder and reservoir unit 69 relative to the piston 71.

Although the invention has been described with respect to a preferred embodiment thereof it is to be understood that it is not to be so limited since changes and modifications can be made therein within the full intended scope of this invention as defined in the appended claims.

We claim:

1. A hitch and trailer brake actuator assembly for use between tractor and trailer vehicles comprising:
    (a) first and second axially telescoping tubular members, said first member being attachable to the tractor vehicle and the second member being attachable to the trailer vehicle,
    (b) coacting means on said first and second members limiting the relative longitudinal contracting and expanding movement therebetween,
    (c) a master cylinder assembly having a piston movable within a master cylinder to establish hydraulic pressure,
    (d) a pair of mounting members for supporting the master cylinder assembly on the second member, each mounting member having means for yieldably limiting the longitudinal movement of the master cylinder assembly relative to said second member, and
    (e) means connecting the piston to the first member whereby upon relative contracting movement between the first and second members the master cylinder moves relative to the piston to develop hydraulic pressure.

2. In a hitch and trailer brake actuator assembly for connecting a trailer vehicle to a tractor vehicle,
    (a) a pair of interconnected relatively movable telescoping hitch members, one attachable to a trailer and the other attachable to a tractor,
    (b) means for limiting the relative longitudinal movement between said hitch members,
    (c) coacting concave and convex bearing surfaces on said hitch members for guiding the relative movement of said members in linear paths parallel to the longitudinal axes thereof,
    (d) master cylinder means having piston means movable to establish hydraulic pressure,
    (e) means resiliently mounting the master cylinder means on said one hitch member for limited longitudinal movement, and
    (f) means connecting the piston to the other hitch member.

3. In a hitch and trailer brake actuator assembly for connecting a trailer vehicle with a tractor vehicle,
    (a) a pair of interconnected relatively movable hitch members, one attachable to a trailer and the other attachable to a tractor,
    (b) a master cylinder assembly means having a piston movable to establish a predetermined maximum hydraulic pressure,
    (c) means resiliently mounting the master cylinder assembly means on said one hitch member for limited longitudinal movement being operable to prevent movement of said piston relative to said master cylinder assembly means on establishment of said predetermined maximum hydraulic pressure, and
    (d) means drivingly connecting the piston to the other hitch member.

4. The assembly defined in claim 3 including:
    (a) a track member connected to one of said hitch members, said track member having at least one bearing surface with an irregular contour forming longitudinaly extended guide portions, and
    (b) a transversely extended roller means on the other of said hitch members, said roller means having peripheral portions corresponding in shape to said bearing surface for bearing engagement therewith, said track member and roller means operative to guide the relative movement of said hitch members in linear paths substantially parallel to the longitudinal axes thereof.

5. A hitch and trailer brake actuator assembly for use between tractor and trailer vehicles comprising:
    (a) first and second axially telescoping tubular members, said first member being attachable to the tractor vehicle and the second member being attachable to the trailer vehicle,
    (b) coacting means on said first and second members limiting the relative longitudinal contracting and expanding movement therebetween,
    (c) a master cylinder assembly means having a piston movable within a master cylinder to establish a predetermined maximum hydraulic pressure, (d) means resiliently mounting the master cylinder assembly means on the second member for longitudinal movement relative to said second member being operable to move said master cylinder assembly longitudinaly of siad second member on establishment of said predetermined maximum hydraulic pressure, and (e) means drivingly connecting the piston to the first member whereby upon relative contracting movement between the first and second members the master cylinder moves relative to the piston to develop hydraulic pressure.

6. A hydraulic actuator assembly for supplying operating hydraulic pressure to a predetermined maximum pressure, comprising:

(a) first and second axially telescoping members, (b) a master cylinder assembly means having a piston movable within a master cylinder to establish a maximum hydraulic pressure therein, (c) means drivingly connecting the piston to the first member to develop hydraulic pressure upon relative contracting movement between said first and second members, and (d) means resiliently mounting said master cylinder assembly means on the second member for longitudinal movement relative to said second member substantially preventing relative movement between said piston and said master cylinder on establishment of said predetermined maximum hydraulic pressure.

7. A hydraulic actuator assembly for supplying operating hydraulic pressure to a predetermined maximum pressure, comprising:

(a) a first frame member, (b) a master cylinder assembly means having a piston movable within a cylinder to establish the predetermined maximum hydraulic pressure therein, (c) actuating means for moving the piston within said cylinder for pressures up to the maximum pressure, and (d) means resiliently mounting said master cylinder assembly on said first frame member being operable on establishment of said maximum hydraulic pressure to prevent movement between said piston and said cylinder and said actuating means moving said master cylinder assembly means as a unit relative to said first frame member against the force of said resilient mounting means to maintain said maximum hydraulic pressure.

References Cited by the Examiner

UNITED STATES PATENTS

| 2,476,003 | 7/1949 | Symmonds | 188—112 |
| 3,180,455 | 4/1965 | De Puydt et al. | 188—112 |

DUANE A. REGER, *Primary Examiner.*

MILTON BUCHLER, *Examiner.*